(12) United States Patent
Smith et al.

(10) Patent No.: US 7,445,293 B2
(45) Date of Patent: Nov. 4, 2008

(54) RESTRAINT SAFETY DEVICE

(76) Inventors: Carrie L. Smith, 9949 Maya Linda Rd. #31, San Diego, CA (US) 92126; Julie A. Brown, 4284 Campus Ave., San Diego, CA (US) 92103; Nicholas E. Rambo, 9949 Maya Linda Rd. #31, San Diego, CA (US) 92126; Aaron A. Brown, 4284 Campus Ave., San Diego, CA (US) 92103

( * ) Notice: Subject to any disclaimer, the term of this patent is extended or adjusted under 35 U.S.C. 154(b) by 0 days.

(21) Appl. No.: 11/378,910

(22) Filed: Mar. 17, 2006

(65) Prior Publication Data

US 2007/0102990 A1    May 10, 2007

Related U.S. Application Data

(63) Continuation-in-part of application No. 11/267,688, filed on Nov. 4, 2005, now abandoned.

(51) Int. Cl.
*A47C 31/00* (2006.01)
(52) U.S. Cl. .................... 297/484; 297/482; 297/463.1; 24/614
(58) Field of Classification Search ................. 297/484, 297/482, 463.1, 463.2; 24/614, 615, 602
See application file for complete search history.

(56) References Cited

U.S. PATENT DOCUMENTS

| | | | | |
|---|---|---|---|---|
| 4,569,106 | A * | 2/1986 | Lovato | 24/615 |
| 5,444,899 | A * | 8/1995 | Koppelomaki | 24/625 |
| 6,220,662 | B1 * | 4/2001 | Franco-Vila et al. | 297/256.13 |
| 6,460,232 | B2 * | 10/2002 | Maruoka | 24/615 |
| 6,662,413 | B2 * | 12/2003 | Glover | 24/615 |
| 7,096,545 | B2 * | 8/2006 | Uehara et al. | 24/614 |
| 7,100,252 | B2 * | 9/2006 | Anscher | 24/615 |

* cited by examiner

*Primary Examiner*—David R Dunn
*Assistant Examiner*—Erika Garrett
(74) *Attorney, Agent, or Firm*—John R. Ross; John R. Ross, III

(57) ABSTRACT

A restraint safety device. A chest clip is slidingly attached to a first shoulder strap and a second shoulder strap. The chest clip includes a first chest clip half removably attached to a second chest clip half. A child resistant lock prevents a child from inadvertently detaching the first chest clip half from the second chest clip half In a preferred embodiment the child resistant lock includes a squeezable threaded cap that locks the first chest clip half to the second chest clip half and is removable by an adult when squeezed and turned. In another preferred embodiment the child resistant lock includes a cover lock that locks the first chest clip half to the second chest clip half via prongs and is removable when an adult squeezes the prongs and lifts the cover lock. In another preferred embodiment the child resistant lock includes a cap that covers a press release button. By an adult pressing down on the cap and turning the cap, the press release button is pressed and the first chest clip half can be separated from the second chest clip half. In another preferred embodiment, at least one chest clip stop is attached to each shoulder strap. The chest clip stops function to prevent or limit the sliding of the chest clip and to keep the chest clip properly positioned over the user's chest. In another preferred embodiment, dialable tumblers retain a male insertion piece inside a female receptor. In order to remove the male insertion piece from the female receptor a parent dials the dialable tumblers until they are properly aligned.

8 Claims, 15 Drawing Sheets

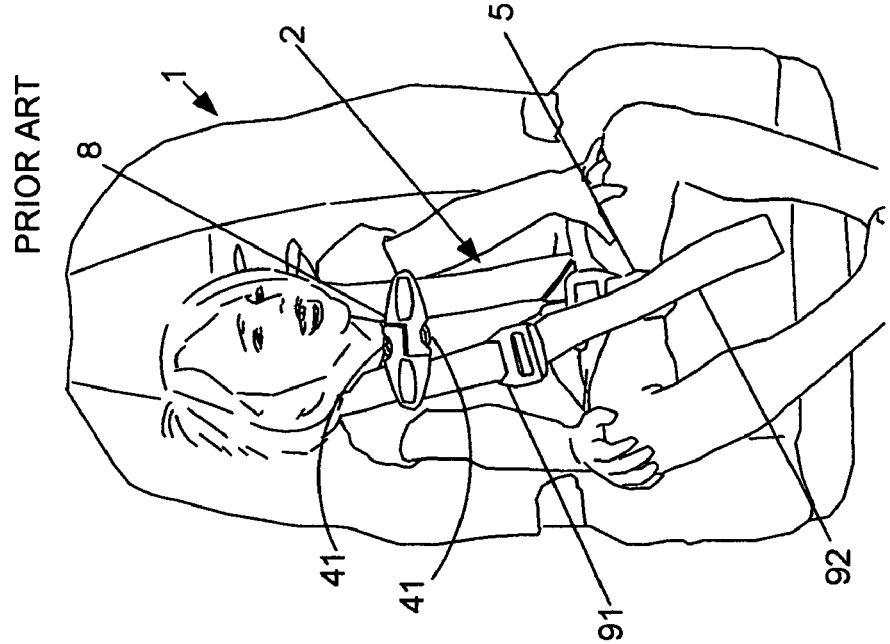
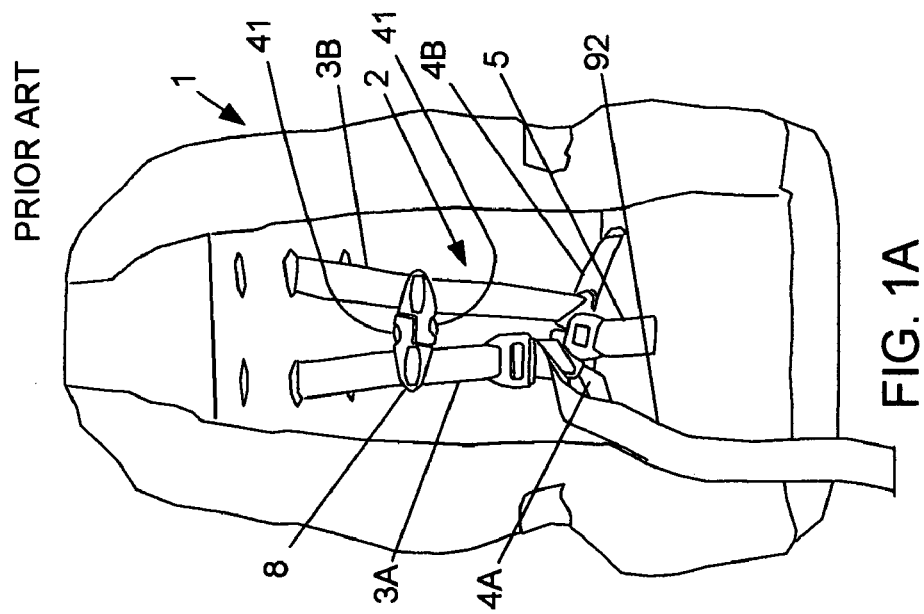

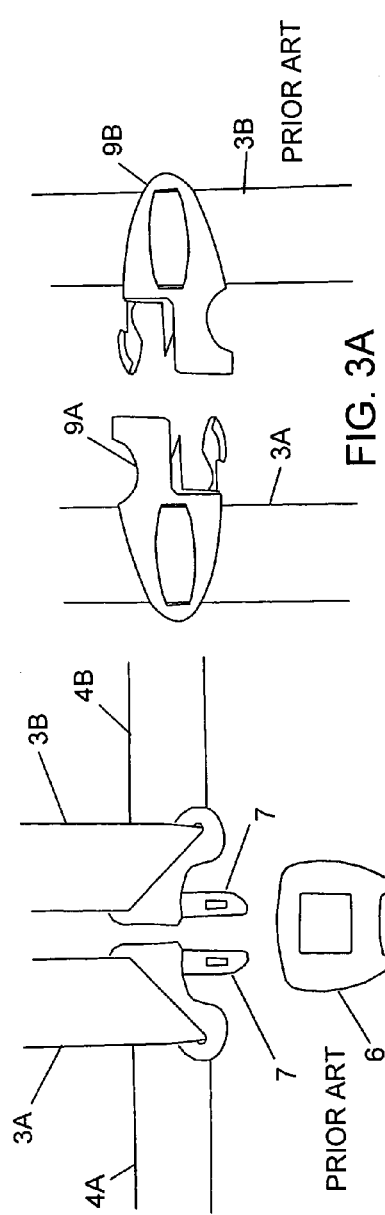
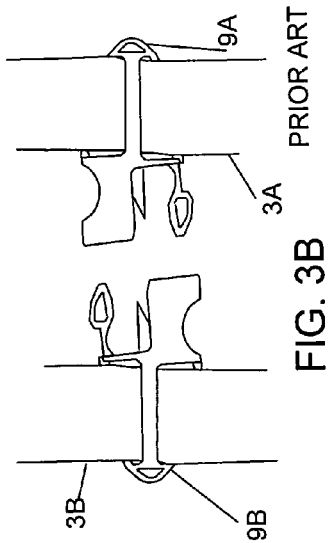
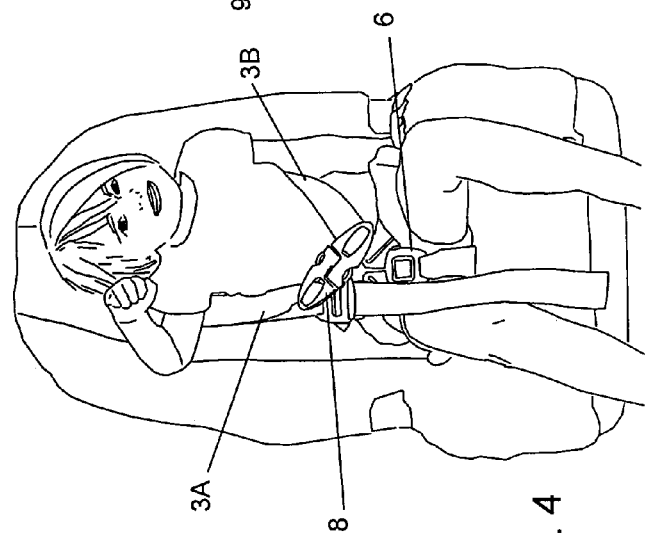
FIG. 2 PRIOR ART
FIG. 3A PRIOR ART
FIG. 3B PRIOR ART
FIG. 4

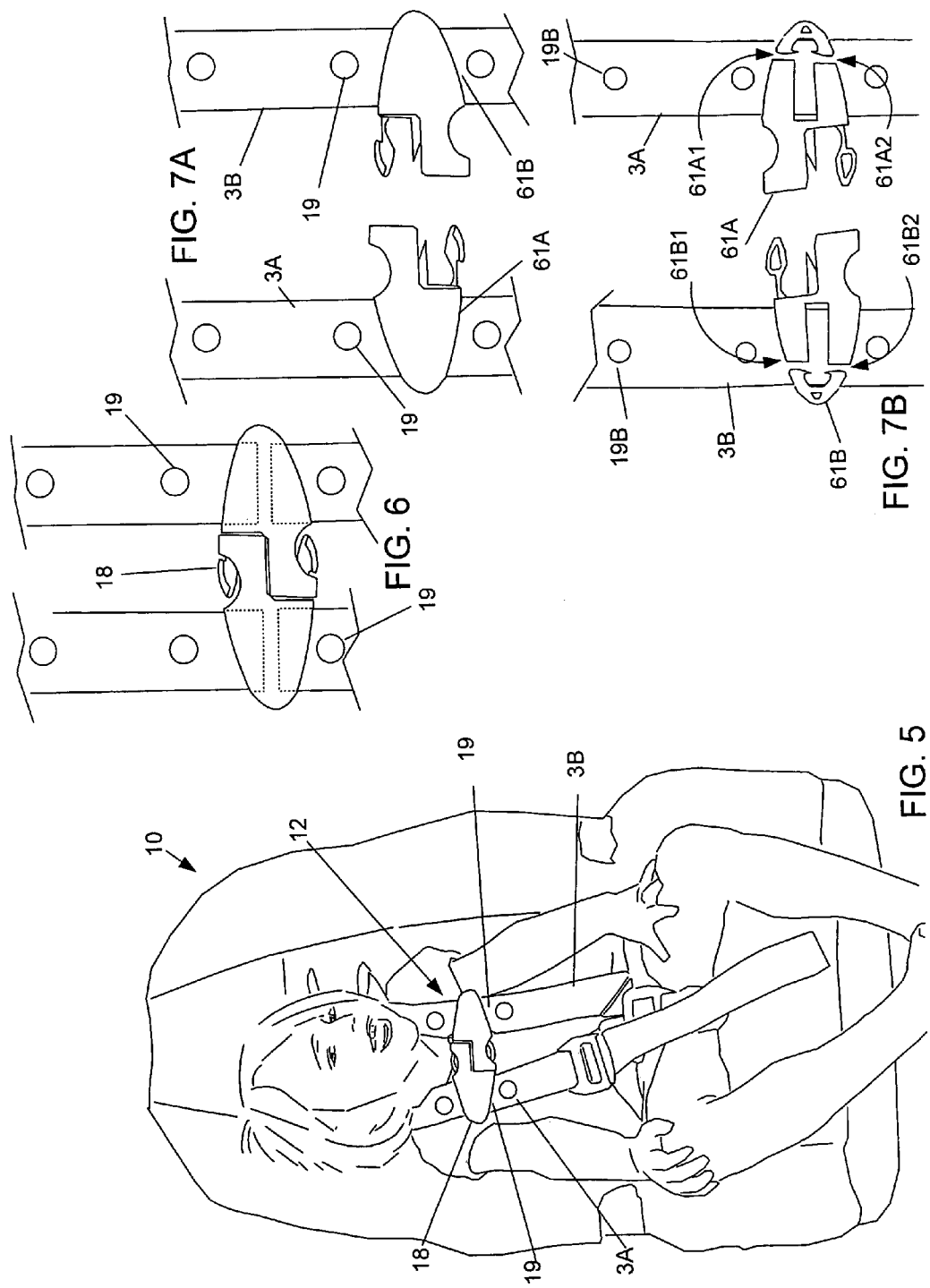

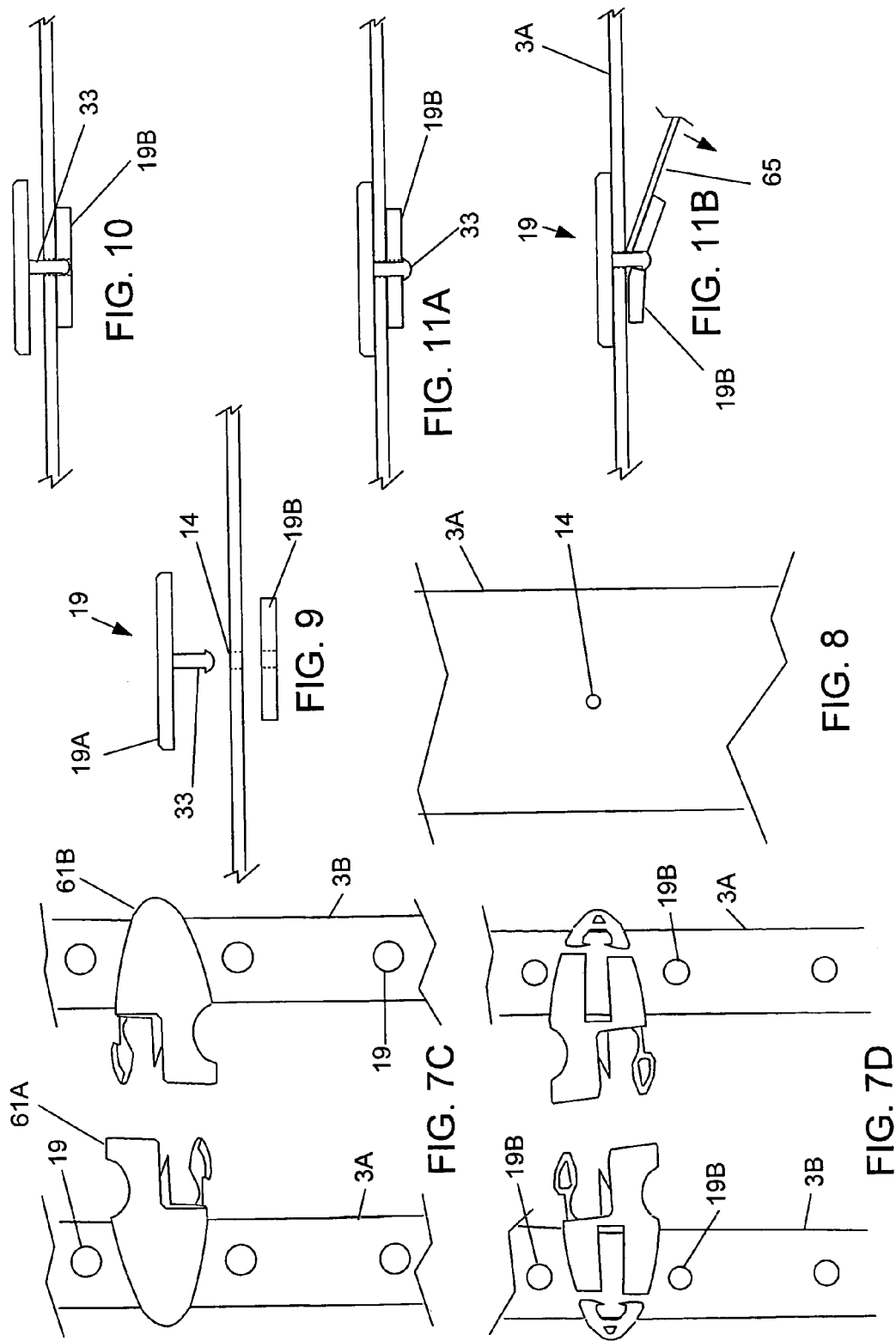

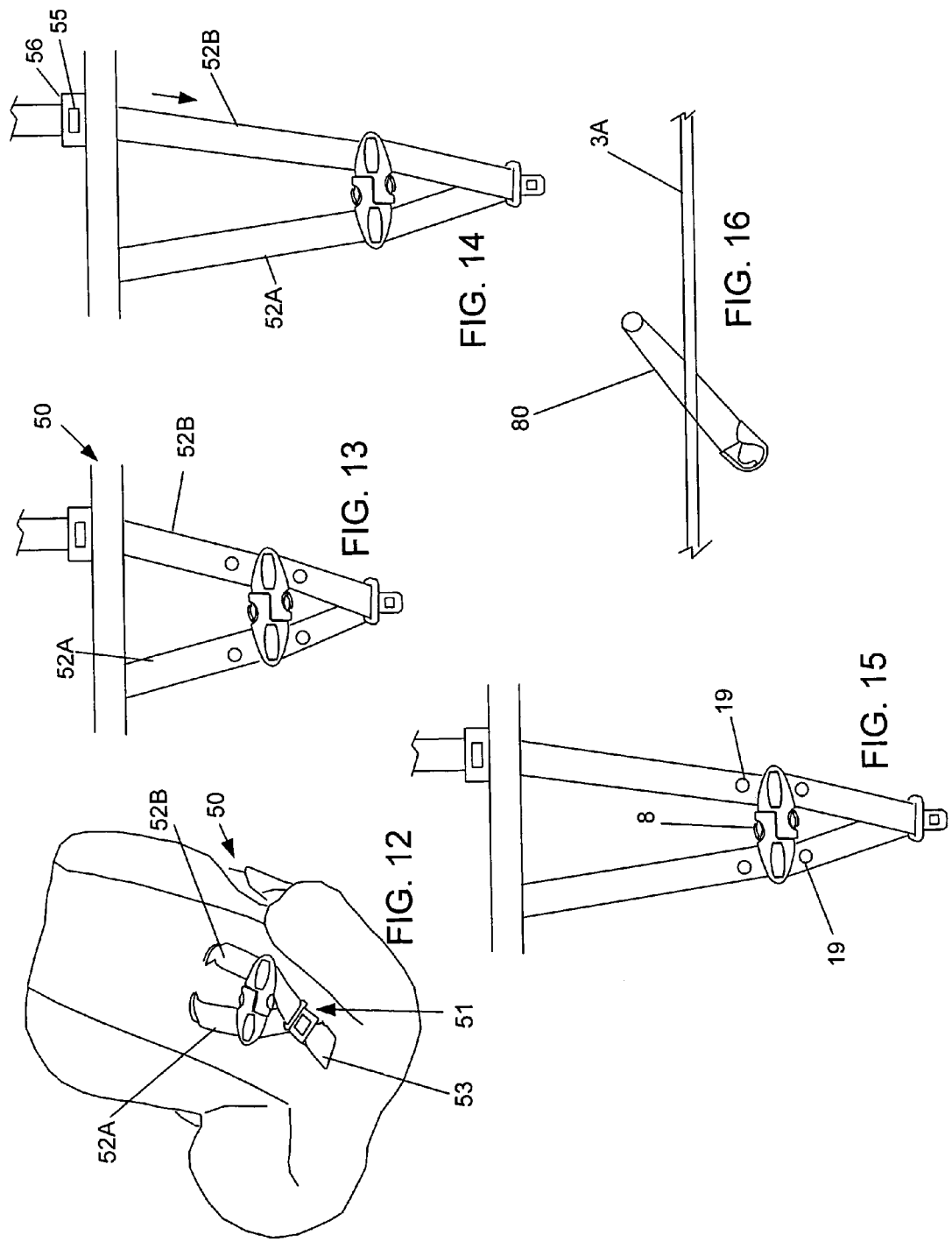

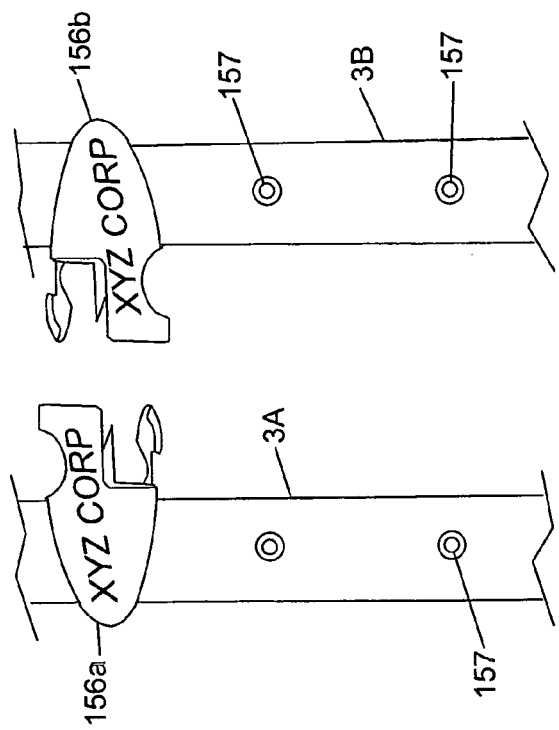
FIG. 21
FIG. 22
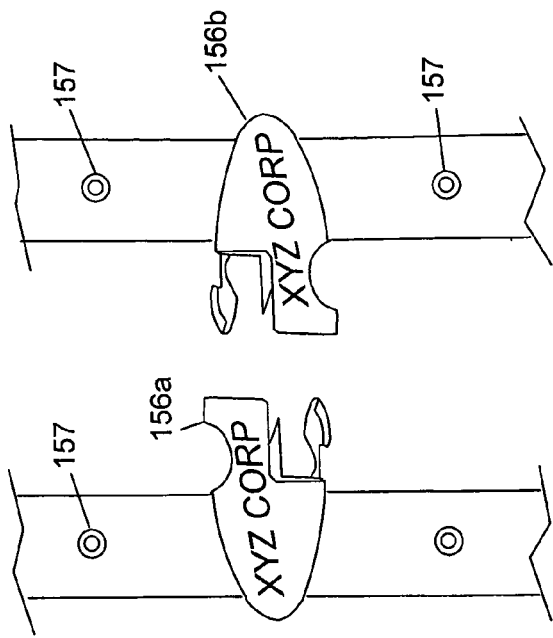
FIG. 23
FIG. 24

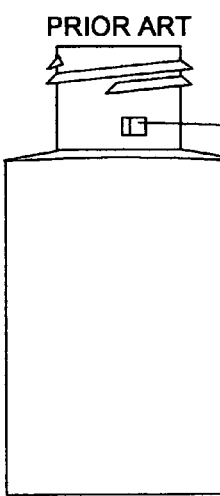
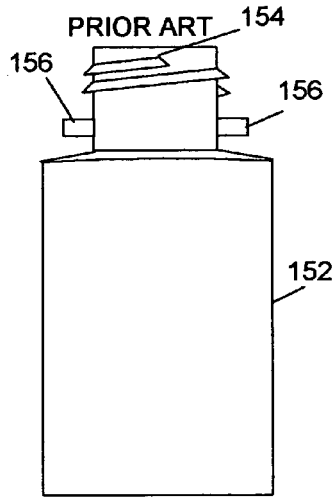
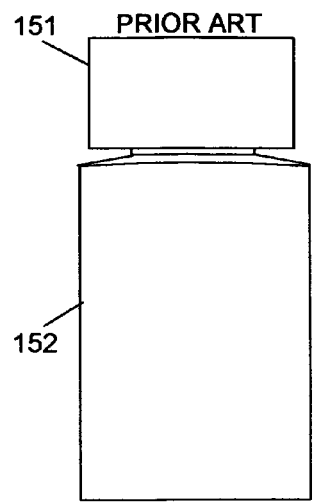
FIG. 25 PRIOR ART  FIG. 26 PRIOR ART  FIG. 27 PRIOR ART
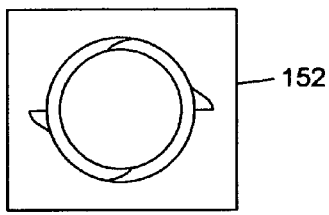
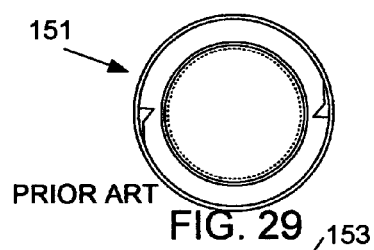
FIG. 28 PRIOR ART  FIG. 29 PRIOR ART
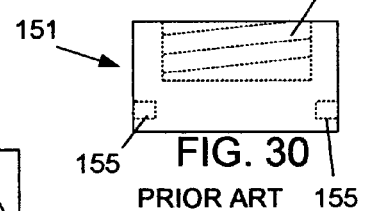
FIG. 30 PRIOR ART
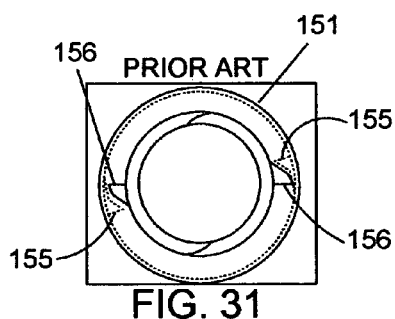
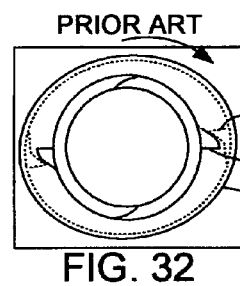
FIG. 31 PRIOR ART  FIG. 32 PRIOR ART
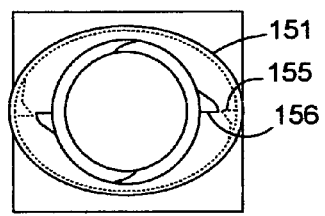
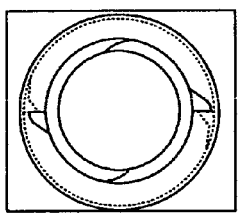
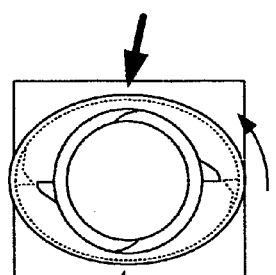
FIG. 33 PRIOR ART  FIG. 34 PRIOR ART  FIG. 35 PRIOR ART

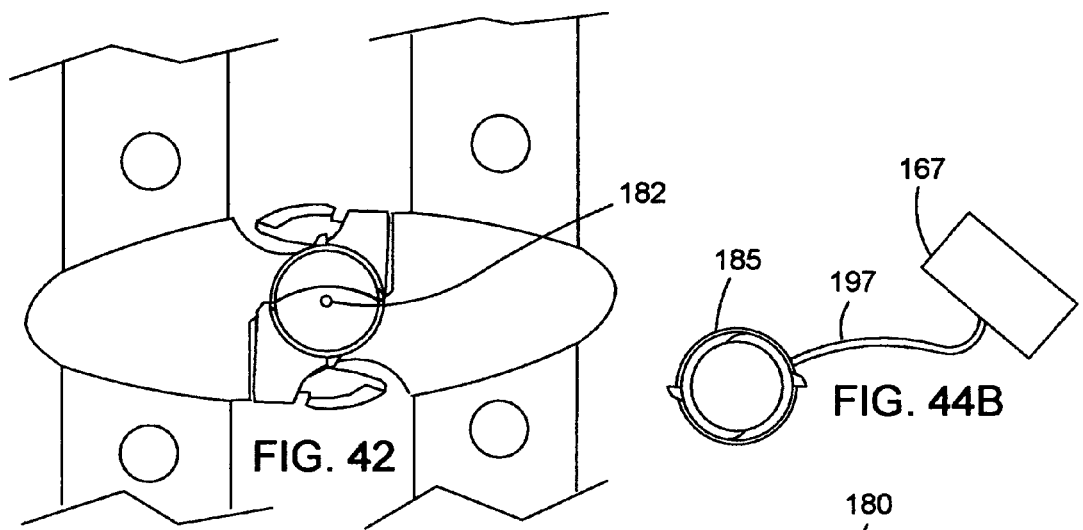
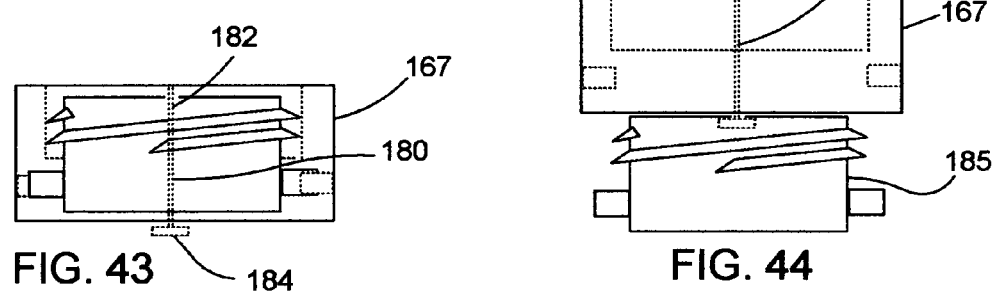
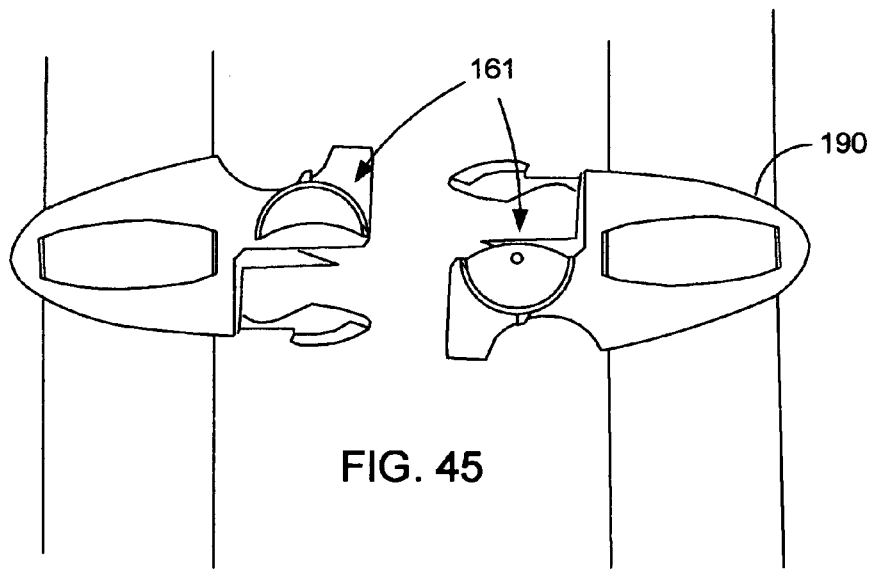

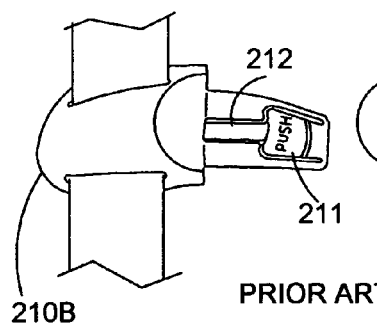
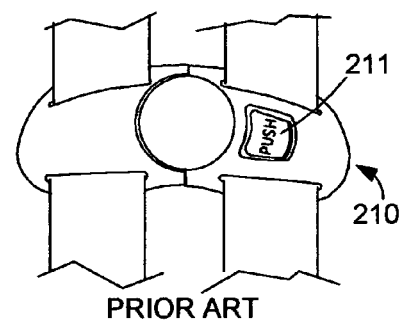
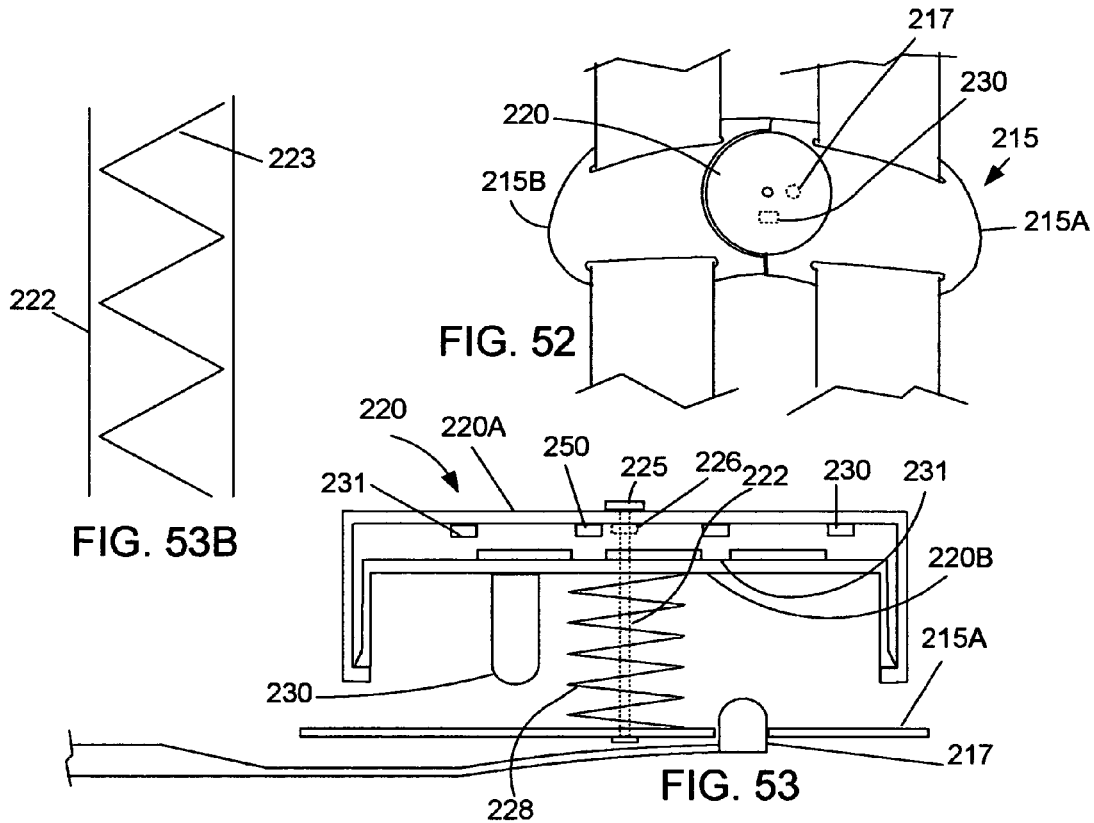

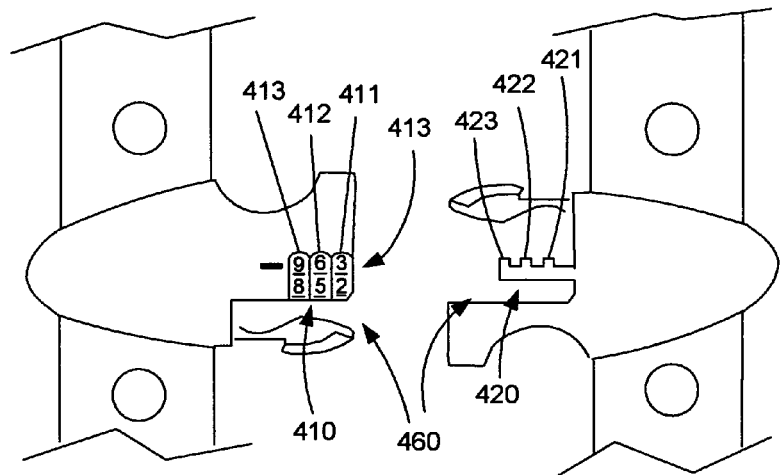
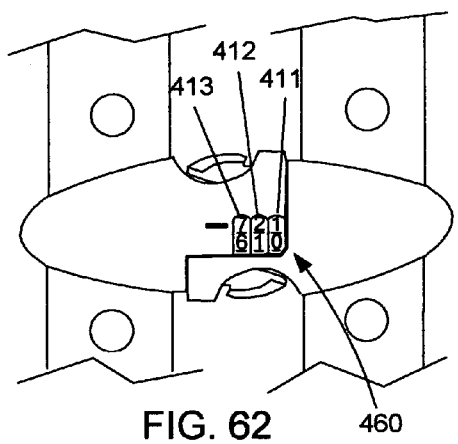
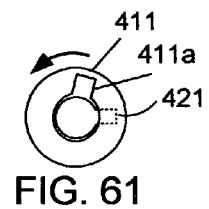
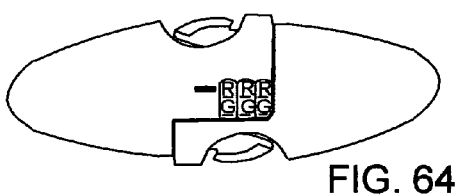
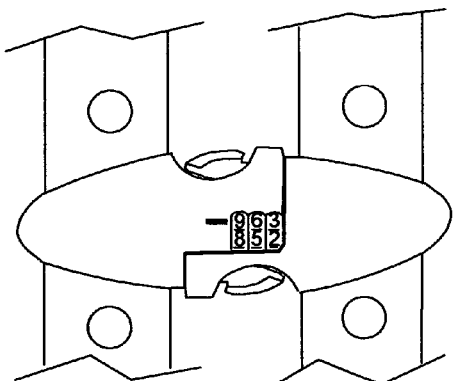
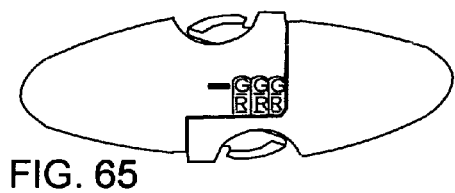
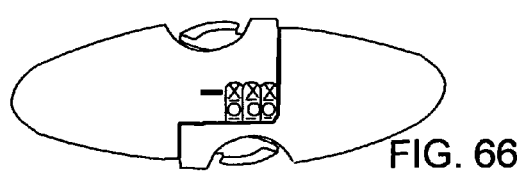

RESTRAINT SAFETY DEVICE

The present invention relates to restraint safety devices, and in particular, to child safety harness systems. This application is a continuation-in-part of Ser. No. 11/267,688 filed Nov. 4, 2005, now abandoned, the specification of which is herein incorporated by reference.

BACKGROUND OF THE INVENTION

All states in the U.S. have laws of varying requirements regarding child safety seats for automobiles. For example, in California children must be secured in an appropriate child passenger restraint (safety seat or booster seat) in the back seat of a vehicle until they are at least 6 years old or weigh at least 60 pounds.

FIG. 1A shows prior art child car seat 1 and FIG. 1B shows a child strapped into prior art child car seat 1. Car seat 1 utilizes popular 5-point harness system 2 to secure the child. The 5-point harness system includes five straps: two shoulder straps 3A and 3B, two hip straps 4A and 4B, and 1 crotch strap 5. The length of shoulder straps 3A, 3B and hip straps 4A, 4B can be adjusted by pressing latch 91 to release compressive pressure on strap 92. Prior art child seat 1 is available from the Evenflow Corporation with Offices in Piqua, Ohio, Model No. 3261420.

After placing the child into the car seat, crotch strap 5 is drawn upwards between the child's legs and buckle tongues 7 (FIG. 2) are slid into buckle 6. Clip half 9A and Clip half 9B (FIGS. 3A and 3B) are snapped together to form chest clip 8 (FIG. 1B). Both halves 9A and 9B of chest clip 8 are free to slide up or down shoulder straps 3A and 3B so that clip 8 is appropriately positioned over the child's chest.

Applicants have discovered dangerous problems with the car seat design described above.

What is needed is a more reliable child safety seat.

SUMMARY OF THE INVENTION

The present invention provides a restraint safety device. A chest clip is slidingly attached to a first shoulder strap and a second shoulder strap. The chest clip includes a first chest clip half removably attached to a second chest clip half. A child resistant lock prevents a child from inadvertently detaching the first chest clip half from the second chest clip half. In a preferred embodiment the child resistant lock includes a squeezable threaded cap that locks the first chest clip half to the second chest clip half and is removable by an adult when squeezed and turned. In another preferred embodiment the child resistant lock includes a cover lock that locks the first chest clip half to the second chest clip half via prongs and is removable when an adult squeezes the prongs and lifts the cover lock. In another preferred embodiment the child resistant lock includes a cap that covers a press release button. By an adult pressing down on the cap and turning the cap, the press release button is pressed and the first chest clip half can be separated from the second chest clip half. In another preferred embodiment, at least one chest clip stop is attached to each shoulder strap. The chest clip stops function to prevent or limit the sliding of the chest clip and to keep the chest clip properly positioned over the user's chest. In another preferred embodiment, dialable tumblers retain a male insertion piece inside a female receptor. In order to remove the male insertion piece from the female receptor a parent dials the dialable tumblers until they are properly aligned.

BRIEF DESCRIPTION OF THE DRAWINGS

FIGS. 1-4 show a prior art child safety seat.
FIGS. 5-7D show a preferred embodiment of the present invention.
FIGS. 8-11A show a preferred method for attaching preferred chest clip stops to the shoulder straps.
FIG. 11B shows a preferred method for removing chest clip stops.
FIGS. 12-15 show another preferred embodiment of the present invention.
FIG. 16 shows another preferred embodiment of the present invention.
FIGS. 21-24 show another preferred embodiment of the present invention.
FIGS. 25-35 show a prior art child resistant cap.
FIGS. 42-44B show another preferred embodiment of the present invention.
FIG. 45 shows another preferred embodiment of the present invention.
FIGS. 50-53 show another preferred embodiment of the present invention.
FIGS. 59-66 show another preferred embodiment of the present invention.

DETAILED DESCRIPTION OF THE PREFERRED EMBODIMENTS

A Problem

Figure 17:
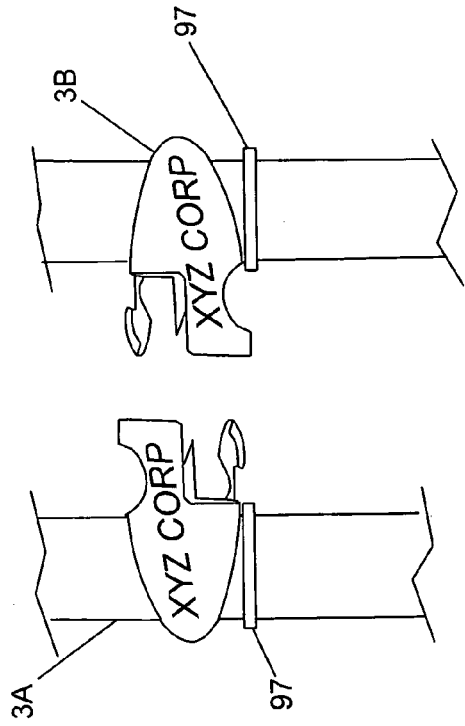
FIG. 17 shows another preferred embodiment of the present invention.

FIG. 4 illustrates a dangerous problem associated with prior art child car seats, which was discovered by one of the Applicants.

In FIG. 4, the child has grabbed chest clip 8 and has slid it down shoulder straps 3A and 3B so that it is no longer appropriately positioned over the child's chest, but instead is near buckle 6. The act of sliding chest clip 8 down shoulder straps 4 puts the child in a position of increased danger. For example, the child has wiggled her shoulders so that her upper body is no longer covered by shoulder straps 3A and 3B. At this point, if the automobile is involved in an accident, the child could potentially suffer head and/or neck injuries, which may include skull fractures, broken neck and jaw fractures, as well as injuries resulting from what is known as "Seat Belt Syndrome". Seat Belt Syndrome has been characterized as a collection of injuries specifically resulting from passengers who were only wearing lap belts upon the impact of a vehicle crash. Injuries typically include: severe abdominal injuries, fractures of the lumbar spine and serious closed head and facial injuries-or even death because the upper body is no longer restrained.

Furthermore, from the position shown in FIG. 4 it is possible for the child to climb out of the 5-point harness system, placing her in even greater danger. If the child climbs out of the car seat and the car is involved in an accident, even a relatively minor accident, the child could suffer severe life threatening injuries.

The Solution

FIG. 5 shows a preferred embodiment of the present invention. Child safety seat 10 includes 5-point harness system 12.

In 5-point harness system 12, chest clip 8 has been replaced with chest clip 18 and buttons 19 have been attached to shoulder straps 3A and 3B. In the first preferred embodiment, buttons 19 function as chest clip stops in that they stop the child from sliding chest clip 18 downward or upward, enabling chest clip 18 to remain appropriately positioned over the child's chest. Because chest clip 18 stays positioned over the child's chest, the child is prevented from escaping from the 5-point harness system and remains securely protected by the car seat harness system.

Chest Clip

A front view of preferred chest clip 18 is shown in FIG. 7A and a rear view is shown in FIG. 7B. In a preferred embodiment, clip half 61A can be removed from shoulder strap 3A and clip half 61B can be removed from shoulder strap 3B.

Buttons Attached to Shoulder Straps

FIG. 6 shows of chest clip 18 and buttons 19. As stated above, buttons 19 prevent the child from sliding clip 18 downwards or upwards. If the child attempts to move chest clip 18, the chest clip will contact the buttons 19 and the movement of chest clip 18 will be blocked by the buttons. Preferably, buttons 19 should be of sufficient thickness and diameter to prevent chest clip 18 from sliding over the buttons. A preferred portion of chest clip 18 located just underneath the cover of chest clip 18 is shown in dotted line in FIG. 6.

Preferred Method of Attaching the Buttons to the Shoulder Straps

FIGS. 8-11A show a preferred method for attaching buttons 19 to the shoulder straps.

In FIG. 8, hole 14 has been punched through shoulder strap 3A.

In FIG. 9, upper part 19A of button 19 has been positioned over hole 14. Lower part 19B has been positioned under hole 14. Upper part 19A preferably includes ductile plastic barb 33.

In FIG. 10, barb 33 has been pushed through hole 14 and partially pushed through the hole in lower portion 19B.

In FIG. 11A, barb 33 has been pushed the rest of the way through the hole in lower portion 19B. Barb 33 is preferably ductile enough so that it can be squeezed through the hole in lower part 19B yet sufficiently firm so that it prevents lower portion 19B from separating after barb 33 has been completely pushed through the hole.

Buttons Permanently Attached to Shoulder Straps

In the preferred embodiment shown in FIGS. 5-7B, buttons 19 are permanently attached to shoulder straps 3A and 3B in a manner similar to that shown in FIGS. 8-11B. As the child grows (or if a larger child uses the car seat), it will most likely be necessary to adjust the length of shoulder straps 3A and 3B and the length of hip straps 4A and 4B. Also, it may be necessary to adjust the position of chest clip 18 so that it remains appropriately positioned over the child's chest.

Because buttons 19 are intended to be permanently attached, an adult will need to remove chest clip 18 from shoulder straps 3A and 3B prior to repositioning chest clip 18. As shown in FIG. 7B, clip half 61B of chest clip 18 includes openings 61B1 and 61B2. Likewise, clip half 61A includes openings 61A1 and 61A2. To remove clip halves 61A and 61B from the shoulder straps, an adult slides straps 3A and 3B out through the openings.

For example, FIG. 5 shows a 3 year old child strapped in child car seat 10. Chest clip 18 is positioned as shown. Prior to placing a larger child (for example, a 6 year old child) into the car seat, the adult will need to increase the length of shoulder straps 3A and 3B and hip straps 4A and 4B. Accordingly, chest clip 18 has been raised so that it is positioned between a different set of buttons 19, as shown in FIGS. 7C and 7D. The position of chest clip 18 has been adjusted so that it will now be appropriately positioned over the larger child's chest.

Buttons Removably Attached to the Shoulder Straps

FIG. 12 shows infant car safety seat 50 having 3-point harness system 51. 3-point harness system includes shoulder straps 52A and 52B and crotch strap 53.

An infant grows very fast and will commonly double their birth weight in the first 4 to 5 months of life. To accommodate the infant's fast growth, the shoulder straps of car safety seat 50 may need to be adjusted every 2 to 3 weeks. Because the alignment between relative positions on strap 52A and 52B shifts as the straps are being lengthened it is preferable to remove buttons 19 prior to adjusting the lengths of straps 52A and 52B. Then, buttons 19 should be reattached after the lengths of straps 52A and 52B have been adjusted.

For example, FIG. 13 shows a simplified top view of shoulder straps 52A and 52B of car seat 50.

In FIG. 14, an adult has removed buttons 19. A preferred method for removing buttons 19 is shown in FIG. 11B. Hard flat tool 65 is inserted between strap 3A and backing 19B. Backing 19B is then pried off.

Then, as shown in FIG. 14, an adult has reached behind car seat 50 and has pressed button 55 of latch 56. This releases compressive pressure on strap 52B and has allowed the adult to pull strap 52B in the direction indicated by the arrow in FIG. 14 to lengthen shoulder straps 52B and 52A.

In FIG. 15, the adult has appropriately adjusted the position of chest clip 8 and has reattached buttons 19 in a fashion similar to that described above in reference to FIGS. 8-11A.

Alternate Applications

Although the above preferred embodiments specifically showed how the present invention can be utilized for child safety seat harnesses, it can likewise be utilized for a variety of other applications. For example, buttons 19 (or a similar stop) can be utilized for but not limited to preventing sliding of a chest clip for the following devices: an infant/toddler front carrier, a stroller, a grocery cart infant seat, a highchair, an infant/toddler backpack carrier, car booster seats, a jogging stroller. There are adult applications for the present invention as well. For example, automobile race car drivers usually utilize shoulder straps as part of their safety harnessing system. Buttons 19 attached to the shoulder straps of an automobile racer can prevent unwanted sliding of a chest clip. This idea could also apply to outdoor recreational safety gear as well as safety restraints used by medical personnel.

Decorative Buttons

In another preferred embodiment, buttons 19 include a design on the front that is decorative and visually appealing to enhance the attractiveness of the car seat.

Decorative Chest Clip Cover

In another preferred embodiment, chest clip 18 (FIG. 6) includes cover 87 (FIG. 17) that preferably includes the logo of the seat supplier.

Snaps as Chest Clip Stops

In another preferred embodiment, snaps are utilized as chest clip stops. For example, FIG. 21 shows chest clip stop halves 156*a* and 156*b* snapped to shoulder straps 3A and 3B. Snaps 157 are attached to shoulder straps 3A and 3B.

In FIG. 22, the parent has unsnapped chest clip stop half 156*a* from shoulder strap 3A. The parent then also unsnaps chest clip stop half 156*b* in a similar manner.

In FIG. 23, the parent has snapped chest clip stop halves 156*a* and 156*b* back onto shoulder straps 3A and 3B in different positions. FIG. 24 shows a side view of chest clip stop half 156a snapped onto strap 3A.

A Second Problem

Applicants have also discovered another problem with prior art child car seats. As shown in FIGS. 1A and 1B, to remove a child from car seat 1, an adult squeezes release tabs 41 to unlock chest clip 8. This will cause halves 9A and 9B to separate to the position shown in FIG. 3A. The child can then be easily removed from the car seat. Unfortunately, however, Applicants have discovered that even very young children are able to successfully squeeze tabs 41 and separate halves 9A and 9B. The child is then not properly restrained and is susceptible to serious injury. Often, because it is so easily accomplished by the child, the adult who is driving the car may not even be aware that the child has squeezed release tabs 41 and is in danger.

In response to this problem, Applicants have developed a chest clip that includes a child resistant lock. The child resistant lock is extremely difficult for a child to unlock during normal everyday usage.

Prior Art Child Resistant Caps

It is known in the prior art to place medicine in bottles that include child resistant caps. For example, FIGS. 25-35 show the usage of child resistant cap 151 with medicine bottle 152. Pills are placed inside bottle 152 and cap 151 is tightened down so that it covers the opening of bottle 152.

To tighten cap 151 on bottle 152, cap 151 is placed on the top of bottle 152 so that threads 153 mesh with threads 154. Cap 151 is then turned clockwise.

In FIG. 31, cap 151 has been turned clockwise to the point that tabs 155 are immediately adjacent stops 156.

In FIG. 32, cap 151 has been turned slightly clockwise from the position shown in FIG. 31. Cap 151 is in the general shape of an ellipse. Tabs 155 have contacted stops 156 and have been forced outward by stops 156.

In FIG. 33, cap 151 has been turned slightly clockwise from the position shown in FIG. 32. Tabs 33 have almost cleared stops 156.

In FIG. 34, cap 151 has been turned slightly clockwise from the position shown in FIG. 33. In FIG. 34, tabs 155 have cleared stops 156. Cap 151 is in the general shape of a cylinder. Cap 151 is now locked in position with tabs 155 behind stops 156. Most young children are now unable to turn cap 151 counterclockwise because of stops 156 adjacent tabs 155.

By squeezing cap 151 at the area indicated by the arrows, an adult can put cap 151 in the general shape of an ellipse, as shown in FIG. 35. Tabs 155 can now clear stops 156. Cap 151 can now be turned counterclockwise so that it can be removed from the top of bottle 152.

A Solution

Chest Clips with Child Resistant Locks

Figure 36:
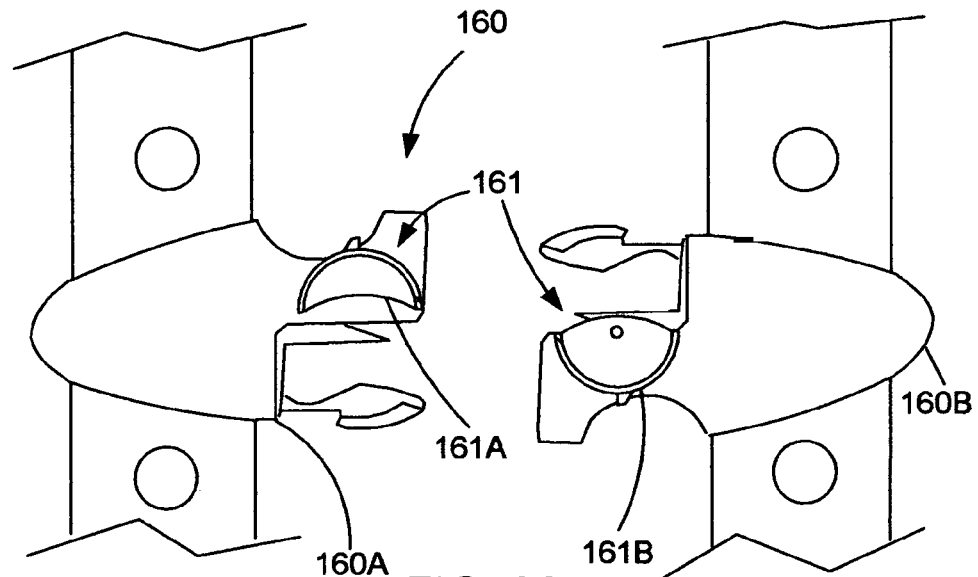
FIGS. 36-41 show another preferred embodiment of the present invention.
Figure 37:
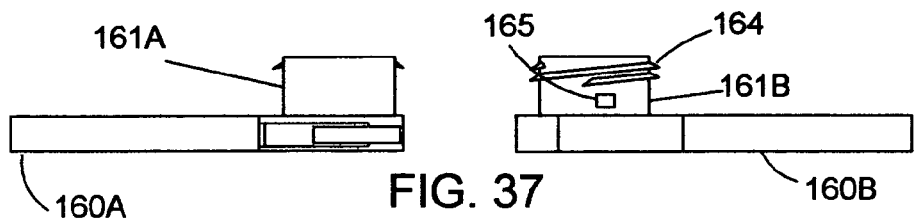
Figure 38:
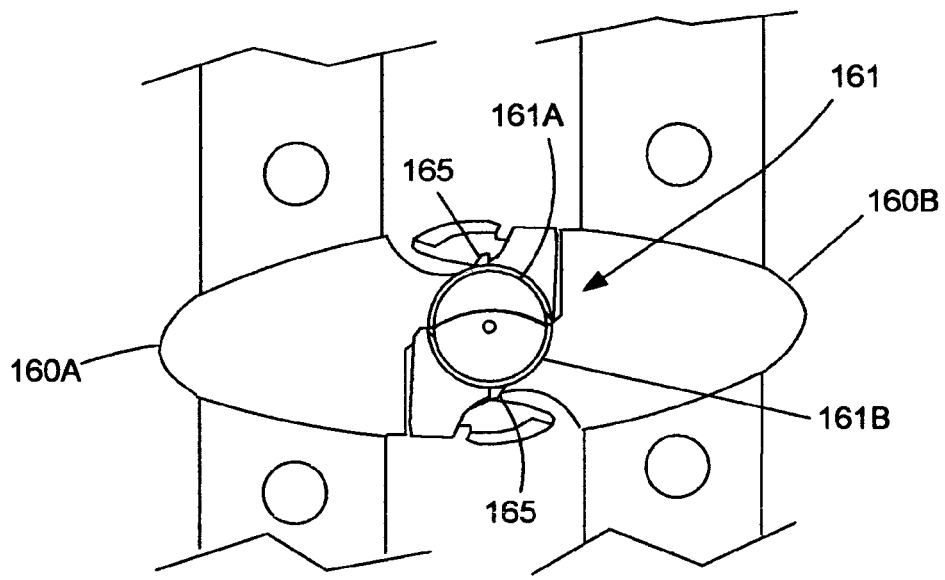

FIG. 36 shows chest clip 160. Chest clip 160 is very similar to the chest clip discussed above in detail in reference to FIGS. 7A-7D with an exception being that chest clip 160 also includes child resistant lock 161. Child resistant lock 161 includes lock half 161A mounted onto chest clip half 160A and lock half 161B mounted onto chest clip half 160B (see also FIG. 37). When chest clip half 160A is snapped together with chest clip half 160B, lock halves 161A and 161B form together in the general shape of a cylinder as shown in FIG. 38.

Figure 39:
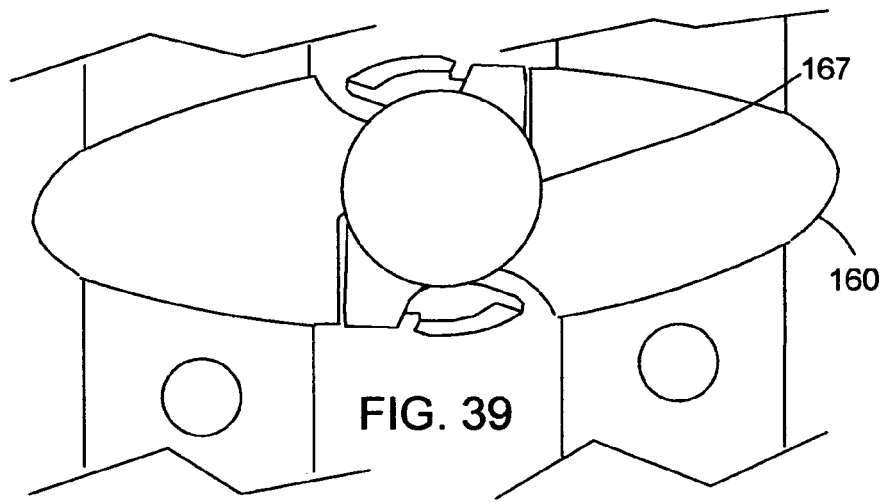

In FIG. 39, threaded cap 167 has been tightened on top of lock 161. Chest clip 160 is now locked. If a child squeezed tabs 169 together, Chest clip 160 would still remain locked by lock 161.

Figure 40:
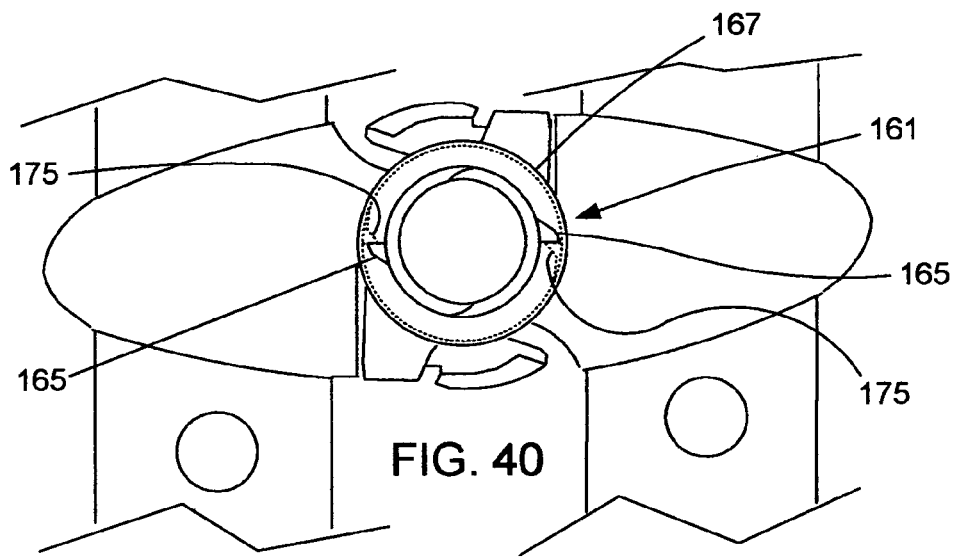
Figure 41:
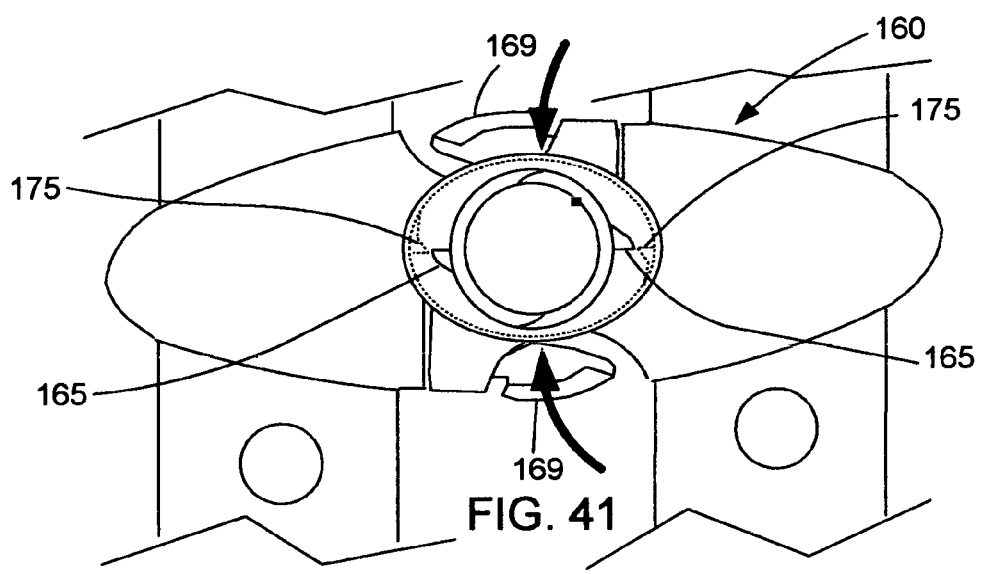
Figure 46:
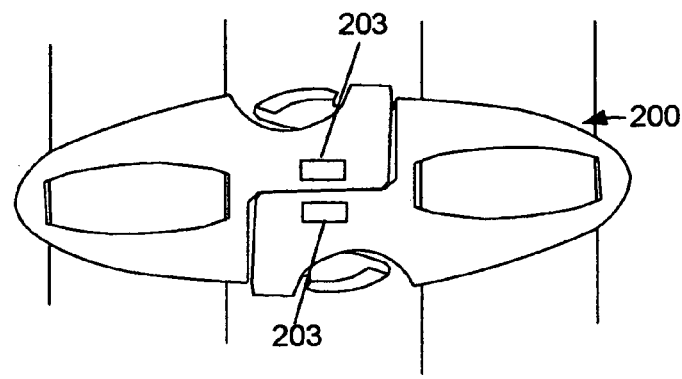
FIGS. 46-49 show another preferred embodiment of the present invention.
Figure 47:
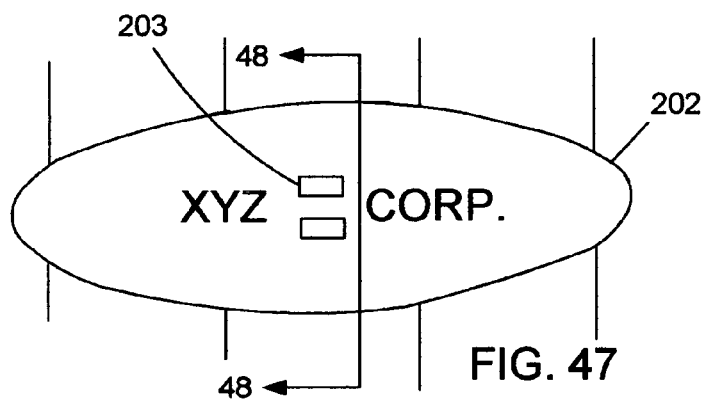

FIGS. 40-41 show the internal mechanisms of cap 167 and illustrate the locking of chest clip 160. Lock 161 operates in a manner similar to prior art bottle 152 shown in FIGS. 25-35.

In FIG. 40, cap 167 has been tightened on top of lock 161. Cap 167 is in the general shape of a cylinder. Cap 161 is locked in position with tabs 175 behind lock stops 165. Most young children are now unable to turn cap 167 counterclockwise because of lock stops 165 adjacent tabs 175.

In FIG. 41, by squeezing cap 167 at the area indicated by the arrows, an adult can put cap 167 in the general shape of an ellipse. Tabs 175 can now clear lock stops 165. Cap 167 can now be turned counterclockwise so that it can be removed from the top of chest clip 160. Once cap 167 is removed from chest clip 160, chest clip 160 can be pulled easily apart after squeezing tabs 169 so that it is in the position shown in FIG. 36.

Chest Clip with Cap Retainer

FIGS. 42-43 show a preferred embodiment of the present invention that also includes cap retainer 180. By utilizing the preferred embodiment shown in FIGS. 42-44, it is unlikely that cap 167 will become inadvertently lost.

Preferably cap retainer 180 is a pin that extends downward from cap 167 through hole 182. Cap retainer 180 includes end piece 184 that has a diameter larger than the diameter of hole 182. End piece 184 keeps cap 167 attached to clip 160 even after cap 167 has been unthreaded from top portion 185, as shown in FIG. 44.

FIG. 44B shows another cap retainer in which cap 167 is attached to top portion 185 via strap 197.

Alternate Chest Clip

Even though FIGS. 36-44 show lock 161 being utilized with a specific chest clip, it should be understood that lock 161 can be also utilized with a variety of chest clip types. For example, FIG. 45 shows lock 161 attached to chest clip 190. Chest clip 190 is very similar to the prior art chest clip shown in FIG. 3A.

Chest Clip with Cover Lock

Figure 48:
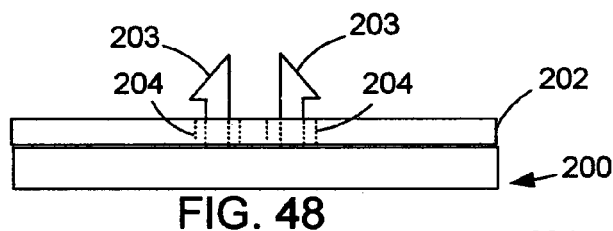
Figure 49:
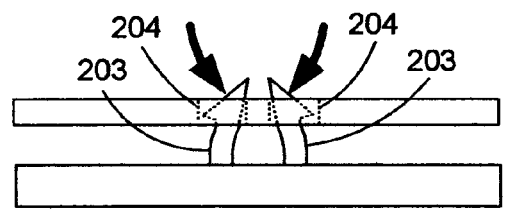
Figure 54:
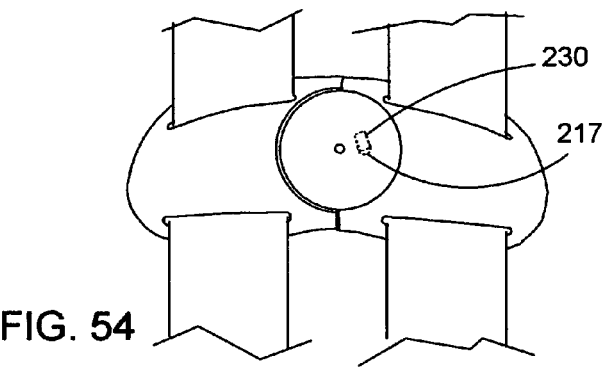
FIGS. 54-58 show another preferred embodiment of the present invention.

FIGS. 46-49 show a top view of chest clip 200. Chest clip 200 includes cover lock 202. Cover lock 202 is another example of a child resistant lock. Prongs 203 are attached to the top of chest clip 200. Cover lock 202 includes holes 204. As shown in FIG. 48, cover lock 202 is set down on top of chest clip 200 with prongs 203 extending through holes 204. While on top of chest clip 200, cover lock 202 prevents a child from unlocking and opening chest clip 200. An adult can remove cover lock 202 from chest clip 200 by squeezing flexible prongs 203 together and lifting upward on cover lock 202. When flexible prongs 203 are squeezed as shown, prongs 203 easily slide through holes 204.

Chest Clip with Alternate Child Resistant Lock

FIGS. 50 and 51 show an example of prior art chest clip 210. As shown in FIG. 50, press-release button 211 is connected to half 210B by flexible arm 212. When press-release button 211 is pressed downward, it releases half 210B from half 210A and chest clip 210 is easily pulled apart. Unfortunately, very young children are able to easily press press-release button 211 while buckled in their car seat, and thereby get up from the car seat.

FIG. 52 shows chest clip 215. Chest clip 215 has been modified so that press-release button 217 is under cap 220. A side view of cap 220 is shown in FIG. 53. Upper cap portion 220A is connected to half 215A via spring-loaded compression pin 222. As shown in FIG. 53, spring loaded compression spring is at its full extension. An enlarged view of compression pin 222 internal compression spring 223 is shown in FIG. 53B. Nut 226 forces upper cap portion 220A up against the head of compression pin 225. Compression spring 228 extends between lower cap portion 220B and half 215A. As shown in FIG. 53, compression spring 228 is at its full extension. Extension piece 230 extends downward from the bottom of lower cap portion 220B.

In contrast to the prior art chest clip shown in FIGS. 50-51, press-release button 217 is covered by cap 220. Therefore, a child is unable to press button 217 and inadvertently open chest clip 215. If a child turns cap 220 in any direction about the axis formed by compression pin 222, upper cap portion 220A will spin. However, lower cap portion 220B will remain essentially stationary due to friction caused by pin 228. Since, lower cap portion will remain essentially stationary and since the lowest surface of extension piece 230 is higher than the highest surface of press-release button 217, there is essentially no danger of a child inadvertently pressing press-release button 217 and opening chest clip 215.

FIGS. 54-58 illustrate the procedures by which an adult can open chest clip 215.

Figure 55:
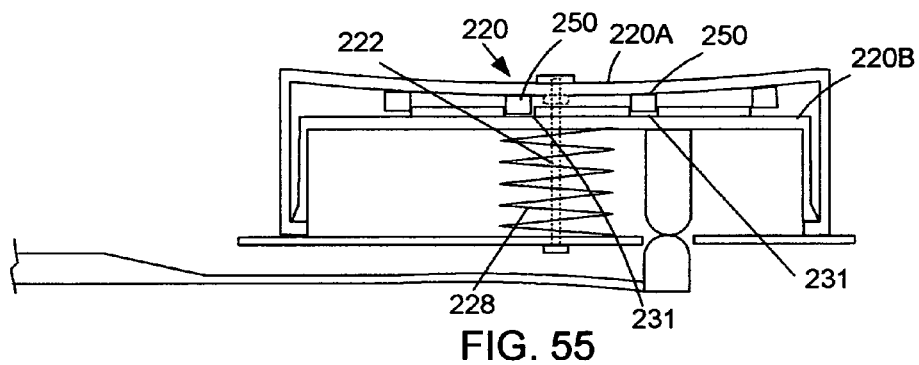
Figure 56:
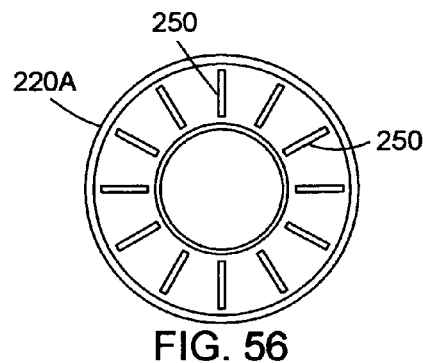
Figure 57:
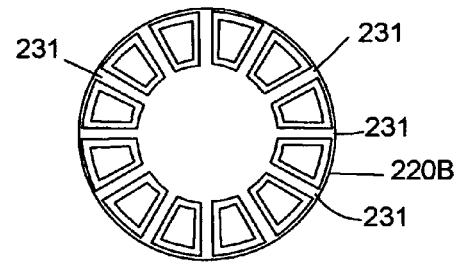
Figure 58:
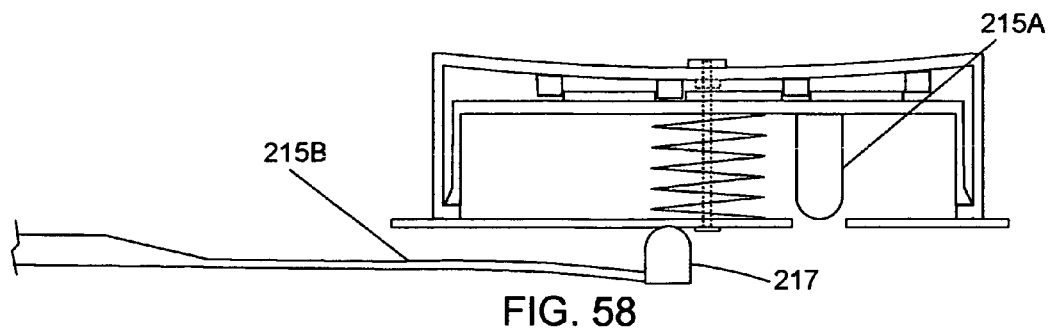

As shown in FIG. 55, an adult presses down on upper cap portion 220A. This causes the upper cap portion to bend down and compression pin 222 and spring 228 to compress. The adult then turns upper cap portion 220A in either direction until male extension members 250 mate with female slots 231. FIG. 56 is a bottom view of the bottom of upper cap portion 220A showing a preferred arrangement of male extension members 250. FIG. 57 is a top view of the top of lower cap portion 220B showing a preferred arrangement of female slots 231. Once male extension members 250 have mated with female slots 231, lower cap portion will turn along with upper cap portion 220A. The adult then continues to turn upper cap portion 220A until extension piece 230 contacts press-release button 217. When extension piece 230 is positioned directly over press-release button 217, press-release button 217 is in the position shown in FIG. 55. Half 215A can then easily be pulled apart from half 215B.

Chest Clip with Other Alternate Child Resistant Lock

Combination bicycle locks are known in the prior art. One such lock is manufactured by Master Lock Company, Part No. ML72202. To open a prior art combination bicycle lock a specific sequence of numbers must be first correctly dialed.

FIGS. 59-63 show another alternate child resistant lock. Child resistant lock 460 includes male insertion piece 420, female receptor 425 and dial 410. Male insertion piece 420 includes tabs 421, 422 and 423 (FIG. 59). Dial 410 includes numbered tumblers 411, 412, and 413. Alternatively, tumblers 411, 412 and 413 could be color-coded. For example, "red" would indicate locked and "green" would indicate open.

FIG. 60 shows an end view of male insertion piece 420 inserted into dial 410. Numbered tumbler 411 has been dialed such that cutout 411a is aligned with tab 421, allowing for proper insertion of male insertion piece 420. Likewise, tumblers 412 and 413 have been similarly aligned to allow of proper insertion of male insertion piece 420.

In FIG. 61, tumbler 411 has been turned so that it is now not aligned with tab 421. Rather, tab 421 is blocked by tumbler 411 so that male insertion piece 420 cannot be pulled out of dial 410. For example, in FIG. 62 male insertion piece 420 has been fully inserted into dial 410. Tumblers 411, 412 and 413 have been turned. A child now will be unable to pull apart his chest clip without an adult first-dialing in the appropriate combination.

In FIG. 63, an adult has dialed in the appropriate combination. The adult can now pull apart the chest clip so that it is in the position shown in FIG. 59.

Figure 19:
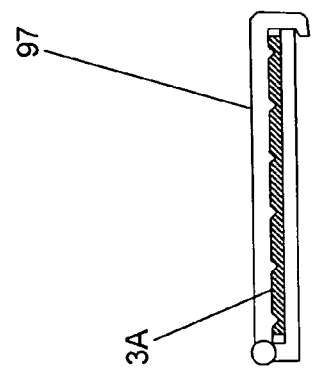
FIGS. 18-20 show another preferred embodiment of the present invention.
Figure 18:
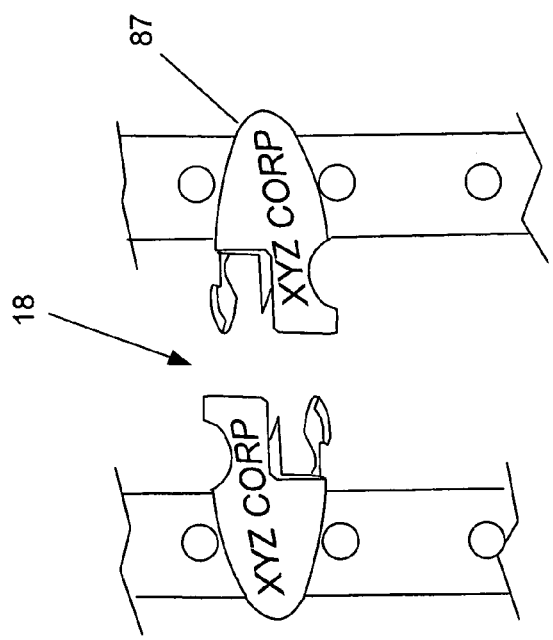
Figure 20:
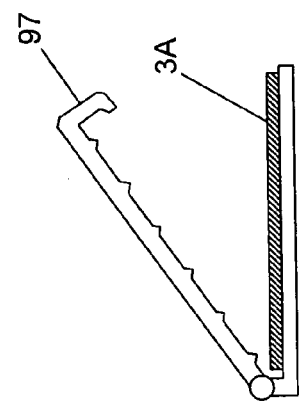

Although the above-preferred embodiments have been described with specificity, persons skilled in this art will recognize that many changes to the specific embodiments disclosed above could be made without departing from the spirit of the invention. For example, although the above preferred embodiments showed a plurality of chest clip stops on the shoulder straps, it would be possible to prevent or limit the sliding of the chest clip by utilizing just one chest clip stop. Also, although the above preferred embodiments showed buttons 19 attached to shoulder straps 3A and 3B, it would be possible to attach other objects to the shoulder straps to prevent the chest clip from sliding. For example, FIG. 16 shows safety pin 80 attached to shoulder strap 3A. Safety pin 80 would stop the sliding of chest clip 8 or 18 in a manner similar to buttons 19. Preferably, a plurality of safety pins would be utilized and they would be attached above and below the chest clip in a fashion similar to buttons 19 shown in FIG. 15. Also, a simple stop in the general shape of a hair barrette can be designed to operate as a chest clip stop. For example, FIG. 18 shows chest clip stop 97 clamped down onto shoulder straps 3A and 3B. Also, FIG. 19 shows a front view of chest clip stop 97 opened and FIG. 20 shows a front view of chest clip stop 97 clamped down onto shoulder straps 3A and 3B. With chest clip stop 97, there is no need to modify clip halves 9A and 9B shown in FIG. 3A. Also, it should be noted that a variety of objects that penetrate the shoulder straps other than a button or a safety pin could be utilized. Some of the many possibilities include a paper clip, a thumb tack, or a pin. If a thumb tack or a pin is utilized the sharp end should be covered with a backing. For example, a preferred backing would screw onto the sharp end of the pin or thumb tack. Also, in addition to the hair barrette shown in FIGS. 18-20, other devices that wrap around the shoulder straps can also be utilized as chest clip stops. For example, fabric can be tied tightly around the shoulder straps. Or duct tape wrapped around the shoulder straps can function as a chest clip stop. Also, it would be possible to run the shoulder straps through a plurality of buckles and utilize the buckles as chest clip stops. Also, it would be possible to attach to the chest clip an object designed to minimize or prevent the sliding or movement of the clip. This object would serve as a redundancy feature that would operate to prevent the sliding and movement of the chest clip in addition to the chest clip stops. For example, the chest clip could include teeth such as teeth on a hair barrette (see FIGS. 18-20), or a non-skid type of rubber or plastic.

Also, in another preferred embodiment, shoulder straps 3A and 3B each include a plurality of prefabricated holes (such as hole 14 shown in FIG. 8). The parent then may then install, remove and replace chest clip stops of whatever form is appealing to the parent (for example, buttons, pins with backings, buckles, safety pins, hair barrettes, etc.). Also, it should be noted that it would be possible to attach buttons 19 in a variety of ways. For example, buttons 19 can be sewn onto shoulder straps 3A and 3B with a needle and thread at the exact position that the parent desires. Then, if it ever becomes necessary to adjust the location of the chest clip, the parent merely need to just cut the thread and move the buttons to the desired location and sew them onto the straps again. By sewing buttons onto the shoulder straps and then re-sewing them at different locations, there is no need to modify clip halves 9A and 9B shown in FIG. 3A. Also, above in the specification in reference to FIGS. 12-15 it is described how buttons 19 are removed when the length of shoulder straps 52A and 52B are adjusted and the position of chest clip 18 is adjusted. It should be recognized that it would also be possible to attach a plurality of buttons 19 to shoulder straps 52A and 52B. Then, to adjust the length of shoulder straps 52A and 52B the buttons can remain attached to the shoulder straps and the chest clip would be removed and reattached appropriately in a fashion similar to that described above in reference to FIGS. 7A-7D. Also, although FIGS. 59-63 show a numbered combination dial 410, it would also be possible to color-code the dial or use symbols. For example, a color-coded dial would preferably be color-coded red and green. When the tumblers were properly aligned to allow male insertion piece 420 to be removed, the tumblers would all indicate "green" (FIG. 65). Alternatively, when the tumblers were aligned to prevent removal of male insertion piece 420, the tumblers would indicate "red" (FIG. 64). In another preferred embodiment, the tumblers are marked with symbols. For example, in FIG. 66, the tumblers indicate the symbol "X" to represent that the tumblers are aligned to prevent removal of male insertion piece 420. To remove male insertion piece 420, the parent would dial the tumblers so that they indicate the symbol "O". Therefore, the attached claims and their legal equivalents should determine the scope of the invention.

We claim:

1. A restraint safety device, comprising:
   A) a first shoulder strap,
   B) a second shoulder strap
   C) a chest clip slidingly attached to said first shoulder strap and said second shoulder strap, said chest clip comprising:
      1. a first chest clip half, and
      2. a second chest clip half removably attached to said first chest clip half, and
   D) a child resistant lock for preventing a child from detaching said first chest clip half from said second chest clip half, said child resistant lock comprising:
      1. a threaded first lock half attached to said first chest clip half,
      2. a threaded second lock half attached to said second chest clip half, wherein said threaded first lock half and said threaded second lock half form a threaded lock when said first chest clip half and said second chest clip half are attached,
      3. at least one lock stop attached to said threaded lock, and
      4. a squeezable threaded cap comprising at least one cap tab, said squeezable threaded cap threaded onto said threaded lock, wherein when said squeezable threaded cap is not squeezed said at least one cap tab is adjacent to said at least one lock stop to prevent said threaded cap from being removed from said threaded lock, wherein when said squeezable threaded cap is squeezed said at least one cap tab clears said at least one lock stop so that said threaded cap can be removed from said threaded lock.

2. The restraint safety device as in claim 1, wherein said at least one lock stop is two lock stops and said at least one cap tab is two cap tabs.

3. The restraint safety device as in claim 1, further comprising at least one chest clip stop attached to said first shoulder strap or said second shoulder strap, wherein said at least one chest clip stop prevents sliding of said chest clip.

4. The restraint safety device as in claim 3 wherein said at least one chest clip stop is a plurality of chest clip stops.

5. The restraint safety device as in claim 3 wherein said at least one chest clip stop is removably attached to said first shoulder strap and said second shoulder strap.

6. The restraint safety device as in claim 3 wherein said at least one chest clip stop is permanently attached to said first shoulder strap and said second shoulder strap.

7. The restraint safety device as in claim 1 wherein said restraint safety device is utilized on a child car seat.

8. The restraint safety device as in claim 1, wherein said chest clip further comprises a cap retainer.

* * * * *